United States Patent [19]

Staton

[11] Patent Number: 4,722,432

[45] Date of Patent: Feb. 2, 1988

[54] ROTARY TRANSFER APPARATUS

[75] Inventor: Colleen Staton, Oakdale, Minn.

[73] Assignee: Doboy Packaging Machinery, Inc., New Richmond, Wis.

[21] Appl. No.: 888,224

[22] Filed: Jul. 23, 1986

[51] Int. Cl.$^4$ ............................................ B65G 37/00
[52] U.S. Cl. .................................. 198/471.1; 198/438; 198/457
[58] Field of Search .................. 198/471.1, 457, 803.5, 198/438

[56] References Cited

U.S. PATENT DOCUMENTS

| | | |
|---|---|---|
| 3,131,929 | 5/1964 | Rehm . |
| 3,352,404 | 11/1967 | Di Settembrini . |
| 3,485,357 | 12/1969 | Payne .................... 198/438 X |
| 3,563,377 | 2/1971 | Southcott ................ 198/471.1 |
| 3,583,548 | 6/1971 | Cadwallader ............ 198/471.1 |
| 3,612,313 | 10/1971 | Lehring . |
| 3,664,891 | 5/1972 | Schubert et al. ......... 198/438 X |
| 3,760,453 | 9/1973 | Neumann . |
| 3,823,809 | 7/1974 | Henry et al. ............. 198/471.1 |
| 3,837,378 | 9/1974 | Kanki et al. ............. 198/567 |
| 3,921,791 | 11/1975 | Bornfleth et al. ........ 198/605 |
| 3,941,233 | 3/1976 | Aiuola et al. ............ 198/471.1 |
| 3,983,987 | 10/1976 | Lynch .................... 198/421 |
| 4,135,619 | 1/1979 | Cerboni ................. 198/471.1 |
| 4,136,767 | 1/1979 | Sarovich ................ 198/404 |
| 4,158,405 | 6/1979 | Jackson ................. 198/471.1 |
| 4,391,372 | 7/1983 | Calhoun ................ 198/438 X |
| 4,445,431 | 5/1984 | Stirbis .................... 198/471.1 |
| 4,550,821 | 11/1985 | Horie et al. . |
| 4,585,113 | 4/1986 | Greenwell . |
| 4,591,046 | 5/1986 | Toste, Jr. et al. ........ 198/457 |

FOREIGN PATENT DOCUMENTS 1584552 2/1981 United Kingdom ............ 198/803.5

Primary Examiner—Randolph A. Reese
Assistant Examiner—Anthony Knight
Attorney, Agent, or Firm—Orrin M. Haugen; Thomas J. Nikolai; Frederick W. Niebuhr

[57] ABSTRACT

A rotary transfer device includes a rotating transfer disc and a valve plate overlying and concentric with the disc. A series of fluid conduits extend radially inward from the disc perimeter, or from a face of a disc near the perimeter, and are open at their inward ends to the disc top surface beneath the valve plate. An arcuate vacuum groove, and a spaced apart air pressure groove, are formed in the bottom surface of the valve plate and open to a vacuum source and pressurized air source, respectively. Rotation of the disc brings the inner end of each conduit into intermittent fluid communication with the vacuum groove at an object acquiring position where the outer end of the conduit is near the feed station. Further rotation of the disc brings the inner conduit end into fluid communcation with the pressure groove, with the outer conduit end near an object discharge position. The angular position of the valve plate can be fixed at different positions, enabling a fine adjustment of the vacuum pick-up and pressure discharge points. In one modification of the transfer device, two or more sets of vacuum grooves and pressure grooves can be formed in the same valve plate, an arrangement particularly useful in merging and sorting operations.

8 Claims, 10 Drawing Figures

ROTARY TRANSFER APPARATUS

BACKGROUND OF THE INVENTION

This invention relates to devices for handling and transporting series of substantially identical objects, and more particularly to a rotary device for sequentially transferring folded cards from a feed station to a discharge station.

The use of automatic manufacturing techniques to reduce product cost is well known. Numerous intermittent "pick and place" devices have been developed for re-positioning and/or re-orienting parts between processing stages. One common need is to continuously re-orient a piece or part in the course of its transfer between two conveyors angularly offset from one another.

A rotary wheel or drum, having a vacuum established at its perimeter, has been found suitable for this purpose. For example, U.S. Pat. No. 3,983,987 to Lynch shows a pair of vacuum wheels 17 and 18, each having radial passageways 24. The negative pressure through the radial openings tends to hold articles A against the wheel perimeter as they are transferred from a chute 15 to a conveyor 14, where a spurt of pressurized air is provided from a chamber 50 to release the article. Upper and lower vacuum control devices 63 and 52, for controlling the degree of vacuum drawn into a rotary system, are shown in U.S. Pat. No. 4,136,767 to Sarovich granted Jan. 30, 1979.

The vacuum in a rotary drum or wheel can be drawn only through selected ones of a series of radial suction ports, by use of an arcuate groove formed in a stationary valve plate next to the rotating drum or wheel. Examples of this approach are shown in U.S. Pat. No. 3,921,791 to Bornfleth et al granted Nov. 25, 1975, and U.S. Pat. No. 3,837,378 to Kanki et al granted Sept. 24, 1974. While these patents disclose apparatus appropriate for certain specific applications, they fall short of the need for a simple, inexpensive rotary transfer device that is adjustable and therefore usable in a variety of situations.

Therefore, it is an object of the present invention to provide a high speed rotary transfer device suitable for transporting a variety of objects.

Another object of the invention is to provide a valve plate for use with a rotary transfer device that is adjustable to alter the timing of positive and/or negative pressure applied through the rotary transfer device.

Yet another object of the invention is to provide a simple, cost-effective means for modifying a rotary transfer device to meet a variety of applications.

SUMMARY OF THE INVENTION

To achieve these and other objects, there is provided an apparatus for transferring workpieces. The apparatus includes a transfer member and means forming at least one fluid conduit through the transfer member. A valve member is provided adjacent the transfer member, and means form a pressure cavity and a vacuum cavity in the valve member. The pressure and vacuum cavities are spaced apart from each other and open to the transfer member. The pressure cavity is in fluid communication with a source of pressurized air, and the vacuum cavity is in fluid communication with a vacuum source. A feed means is provided for supplying workpieces to the transport member, and a discharge means, spaced apart from the feed means, transports workpieces away from the transfer member. The transfer member is movable with respect to the feed means, discharge means and valve member, to sequentially transfer each of the fluid conduits to an object acquiring position in which a first conduit end of the conduit is in fluid communication with the vacuum cavity and a second and opposite end of the conduit is near the feed means, and then to a workpiece discharge position wherein the first conduit end is in fluid communication with the pressure cavity and the opposite conduit end is near the discharge means.

Preferably, the transfer member is a rotatable transfer disc, with the feed means and discharge means located at different angular locations along the disc perimeter. A plurality of fluid conduits can be symmetrically arranged about the transfer disc, with the first conduit end of each radially inward, and the opposed end at the disc perimeter. The valve member can be a valve plate coaxial with the disc, with the vacuum cavity comprising an arcuate groove formed in the plate surface facing the transfer disc. Also, means can be provided for angularly adjusting the valve plate with respect to the feed means and discharge means.

Another aspect of the present invention is a transfer disc for moving workpieces from a feed station to a discharge station. The disc has at least one fluid conduit extended radially inward from an outer end at the disc perimeter. The transfer device further includes a vacuum plate adjacent and coaxial with the disc, with an arcuate vacuum groove in the plate surface facing the disc, the vacuum groove being open to the disc and in fluid communication with a vacuum source. A feed station is provided at the disc periphery, along with a discharge station downstream of the feed station. The vacuum groove is axially aligned with the inward end of each conduit. Consequently rotation of the disc, relative to the valve plate, feed station and discharge station, moves each conduit to an object acquiring position with an inner end thereof in fluid communication with the vacuum cavity and the outer end proximate the feed station, and then to an object discharge position with the inner conduit end isolated from the vacuum cavity and the outer end proximate the discharge station. The valve plate is angularly adjustable with respect to the feed station and discharge station.

The valve plate preferably includes a pressure groove open to the disc and in fluid communication with a source of pressurized air. At the object discharge position, the inner end is in fluid communication with the pressure groove. Consequently, the application of vacuum, and subsequent application of air pressure, can be timed and controlled by the position and arcuate length of the vacuum and pressure grooves. The timing can be precisely adjusted through rotation of the valve plate to a new setting.

For enhanced flexibility, interchangeable valve plates can be provided, with alternative positions and arcuate lengths for the vacuum and pressure grooves. Additional vacuum and pressure grooves can be formed in a valve plate for sorting or merging operations. The valve plate can be made inexpensively from a plastic, for example polyethylene, and thus afford variations in transfer timing and angle without undue increase in expense. The apparatus can be used continuously in connection with timed feeding of workpieces, or used intermittently to reduce or remove a backlog of workpieces at a feed station.

IN THE DRAWINGS

These and other features are more readily appreciated from an examination of the following detailed description in view of the drawings in which.

DETAILED DESCRIPTION OF THE PREFERRED EMBODIMENT

Figure 1:
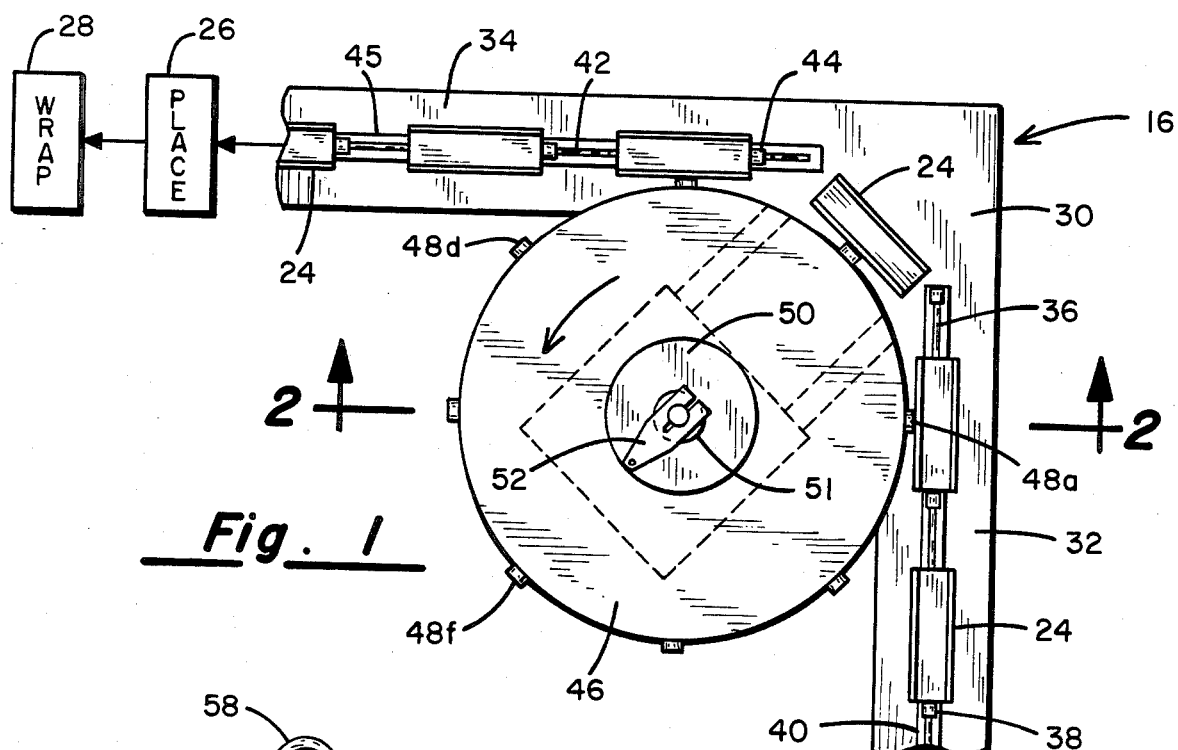
FIG. 1 is a top plan view of a card handling assembly including a rotary transfer device constructed in accordance with the present invention.

Turning now to the drawings, there is shown in FIG. 1 a card handling assembly 16 used in packaging items, for example pastries, cookies, cheeses or other foods, for subsequent vending as individual servings. More particularly, that portion of the apparatus shown in FIG. 1 produces individual workpieces such as card trays and presents the trays for further processing.

A continuous roll 18 of card stock is unwound and fed to a cutting station 20 where it is cut into a series of individual cards of substantially equal length. The cards then are supplied to a folding station 22, where the outside edges of each card are upturned to form a U-board or card tray 24. Subsequently, items to be packaged are placed upon the trays at a placement station 26, after which an outer wrapping, e.g. cellophane, is placed about the item and tray at a wrapping station 28.

Of interest in relation to the present invention is the means for transferring trays 24 from folding station 22 to placement station 26 which is offset from the folding station at an angle of 90°. This card transferring portion of the card handling assembly includes a substantially rigid frame 30 formed into a supply track 32 and an orthogonal discharge track 34. A supply chain 36 is mounted with respect to supply track 32 on sprockets (not shown) with its upper run substantially aligned with the supply track, so that a plurality of supply lugs 38, carried by the supply chain, protrude upwardly beyond the supply track surface through an elongate slot 40 in the track.

In similar fashion, a discharge chain 42 is sprocket-mounted so that its top run is substantially aligned with discharge track 34. A series of discharge lugs 44, carried on the discharge chain, extend upwardly through an elongate slot 45 formed in the discharge track.

The rotary transfer device includes a transfer disc 46 mounted to rotate with respect to frame 30, in the counterclockwise direction as indicated by the arrow. A series of eight transfer cups 48a–48h are distributed symmetrically about the perimeter of disc 46. A valve plate 50 adjacently overlies transfer disc 46, but does not rotate with the disc. Rather, the valve plate is attached to a central shaft 51 and thereby fixed with respect to the frame. However, through a valve adjust fixture 52, the plate may be set in different angular positions with respect to the frame. Valve plate 50 is preferably formed of a high molecular weight plastic for durability and surface smoothness. Extended outwardly from the top of shaft 51 to a vacuum fitting 54 (FIG. 2) in the valve plate, is a vacuum line 56. An air pressure line 58 similarly extends from the shaft to an air pressure fitting 60 provided in the valve plate.

Figure 2:
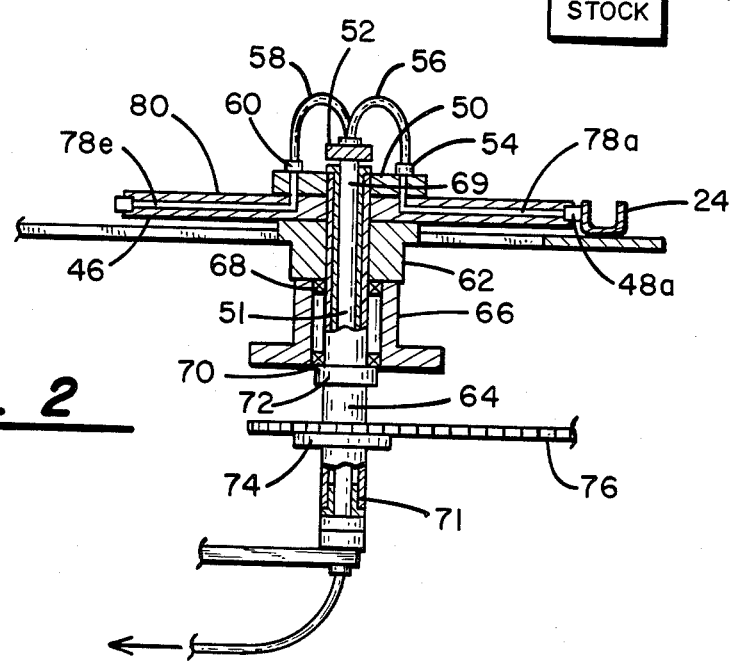
FIG. 2 is a sectional view taken along the line 2—2 in FIG. 1.

From FIG. 2 it is seen that transfer disc 46 is supported on a hub 62, and the disc and hub are both mounted to an outer shaft 64 concentric with central shaft 51. The hub and outer shaft, in turn, are rotatably mounted on a support member 66 integral with frame 30, through bearing assemblies 68 and 70 and bushings 69 and 71. A collar 72 is fixed to the outer shaft and prevents its vertical movement relative to support member 66.

Fixed to outer shaft 64 beneath the collar is a sprocket 74, which is driven by a chain 76 to rotate the outer shaft, hub and transfer disc. It is preferred that chain 76 be entrained also with the drive sprocket for supply chain 36 and discharge chain 42, for synchronizing these chains with transfer disc 46. Preferably this synchronization involves rotating the disc slightly faster for a tangential velocity greater than the linear speed of chain 36, so that trays 24 are pulled away from the lugs and thus more positively removed, to avoid any chance of jamming.

Formed in transfer disc 46 are eight radially extending and symmetrically arranged conduits 78a–h, two of which are shown in FIG. 2. One of suction cups 48 is fastened to each conduit at its radially outward end, by means of a fitting. The radially inward end of each conduit is turned upwardly and is open to the planar top surface 80 of disc 46.

When disc 46 and valve plate 50 are angularly aligned as shown in FIG. 2, conduit 78a is open to a passage through valve plate 50 to vacuum line 56. The vacuum line is formed of flexible hosing, which at first extends upwardly away from the valve plate, but is turned downward and runs through central shaft 51, and then to a vacuum pump not shown. With the disc and valve plates so aligned, one of card trays 24 is held against transfer cup 48a by virtue of the vacuum pulled by the vacuum pump.

Air pressure line 58 is similarly looped downward and runs through the central shaft to a pump (not shown). Containment of the vacuum and pressure lines within central shaft 51 is useful for preventing the lines from interferring with moving parts of the card handling assembly. The pressure and vacuum pumps could be placed above the transfer disc to eliminate the need for such containment if desired.

Figure 3:
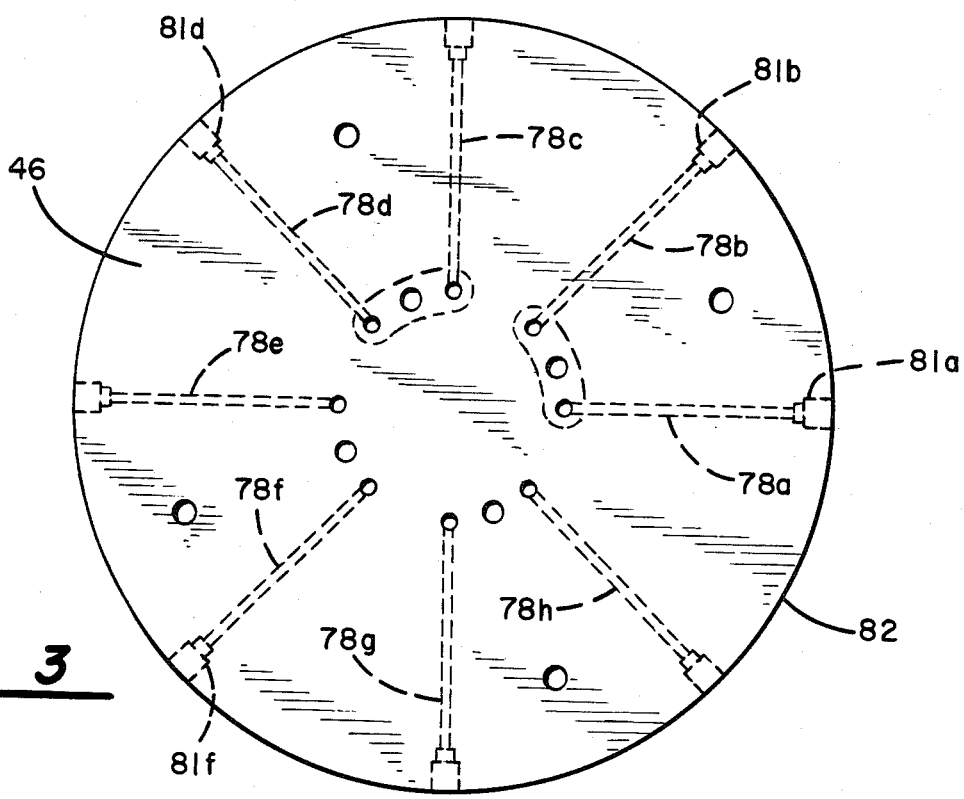
FIG. 3 is a top plan view of a transfer disc of the rotary transfer device.

As is apparent from FIG. 3, the eight conduits 78a–h are symmetrically formed in disc 46, each being directed radially outward from the upward facing inner opening to enlarged outer recesses 81a–h open to the disc perimeter 82. The preferred number of conduits is determined in accordance with the size of disc 46 and the nature of the workpieces (e.g. their size), and the desired speed of transfer. Further, where a reduced number of condutis is desired for a given disc, selected conduits may be blocked by replacing cups 48 with plugs.

Vacuum and pressure grooves from valve plate 50 are superimposed on disc 46 in FIG. 3. The arcuate length of the vacuum groove and the arcuate spacing between successive conduits are such, that for at least part of the time, radially inward ends of two conduits are in fluid communication with the vacuum groove. Such inclusion of two or even more inward ends is a particular advantage for pick-up and placement of flexible items, which can bend to follow the disc circumference due to suction from a plurality of outer openings and the backing provided by the disc circumference, with transfer cups 48 retracted inward slightly past the edge of disc 46. Alternatively, two objects of smaller size could be held, simultaneously, against the disc.

Figure 4:
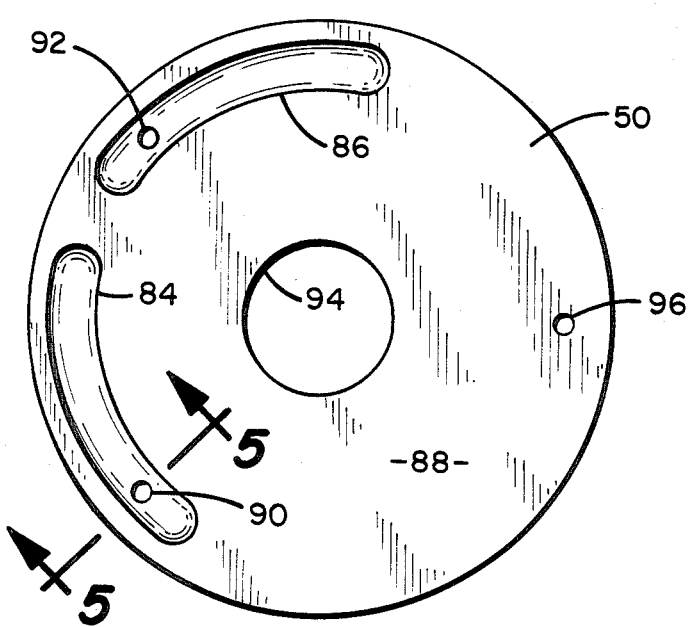
FIG. 4 is a bottom plan view of a valve plate of the rotary transfer device.
Figure 5:
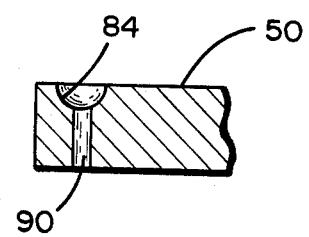
FIG. 5 is a sectional view taken along the line 5—5 in FIG. 4.

In FIG. 4, valve plate 50 has been removed from transfer disc 46 in order to reveal first and second arcuate grooves 84 and 86 formed in the bottom surface 88 of the valve plate. First groove 84 comprises a vacuum groove. A valve plate vacuum port 90 is formed along the groove and extends to the top of the valve plate. Second groove 86 is a pressure groove, along which is formed a valve plate pressure port 92. Thus, the vacuum groove forms a cavity open to the top surface of transfer disc 46 and in fluid communication with vacuum line 56, while the pressure groove forms a pressure cavity spaced apart from the vacuum cavity, open to the transfer disc's top surface and in fluid communication with air pressure line 58. A central opening 94 is formed through valve plate 50 to accommodate central shaft 51, and a radially outward aperture 96 is formed through the valve plate for securing fixture 52 with respect to the valve plate. FIG. 5 shows the surface of first groove 84 to be substantially smooth and concave, and the surface of pressure groove 86 is similar.

Figure 6:
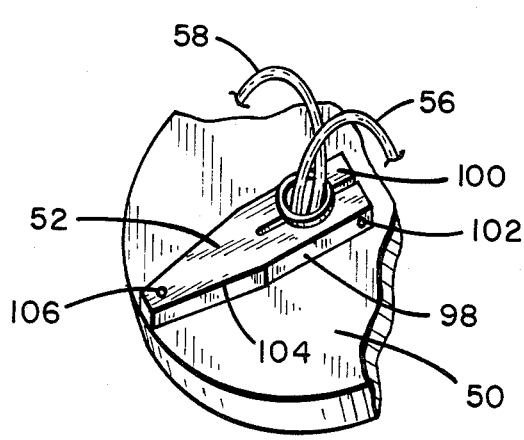
FIG. 6 is a top plan view of a valve adjustment fixture of the rotary transfer device.

As seen in FIG. 6, fixture 52 includes first and second opposed clamping arms 98 and 100 which substantially surround central shaft 51, except for a slight gap between the free ends of the clamping arms. A clamping screw 102, inserted through an opening in first arm 98 and threadedly engaged with second arm 100, draws the clamping arms together when turned into the second clamping arm to frictionally secure fixture 52 on central shaft 51. Inserted through an opening at the tapered end 104 of fixture 52 is a fastening screw 106, which further is threaded into aperture 96 of the valve plate to prevent its rotation relative to the fixture.

Figure 7:
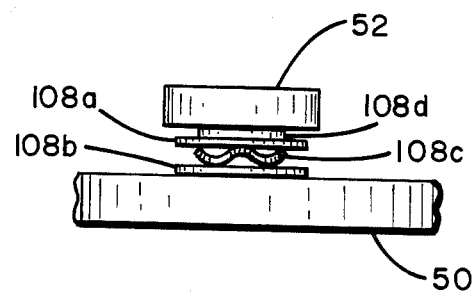
FIG. 7 is an enlarged view of part of FIG. 2.

Additional means for preventing relative rotation between valve plate 50 and fixture 52 is shown in FIG. 7. Supported on central shaft 51 are an upper plate washer 108a, a lower plate washer 108b, and three wave washers, indicated at 108c, contained between the plate washers. A retaining ring 108d, fixed to shaft 51 just below fixture 52, captures the upper plate washer. The wave washers are under compression and thus exert downward force on valve plate 50, thus forcing the valve plate against disc 46 to achieve a good seal between the valve plate and disc, which enhances the vacuum or pressure in the individual transfer cups. While not shown, a slight detent or counterbore can be provided in disc 46 to seat the valve plate.

In the assembled rotary transfer device, valve plate 50 is in concentric, directly overlying relationship to transfer disc 46, with vacuum and pressure grooves 84 and 86 positioned as shown by the broken lines in FIG. 3. The vacuum plate remains stationary while transfer disc 46 is rotated counterclockwise as viewed in FIG. 3.

Thus, the upturned inner opening of each conduit 78 is carried beneath vacuum groove 84 and then beneath pressure groove 86, exposing each conduit in succession to vacuum, then to pressure. In the preferred setting shown in FIG. 3, the upturned end of each conduit is brought into fluid communication with vacuum groove 84 approximately 10° of arc prior to the tray pick-up location, represented by the location of conduit 78a in FIG. 3. The pick-up location corresponds closely to the location of port 90, enabling use of that port and vacuum line 56 as a guide to easily align valve plate 50. A vacuum pulls one of trays 24 against the cup 48 connected to the conduit so long as the conduit remains in fluid communication with the vacuum groove, which is approximately 55° rotation beyond the pick-up location.

Further rotation of disc 46 brings the conduit into fluid communication with pressure groove 86, thus to admit pressurized air radially outward through the conduit and forceably eject the tray from the disc, where it will be engaged and moved onward by one of discharge lugs 44.

As it travels arcuately between vacuum groove 84 and pressure groove 86, each conduit 78 undergoes a transition from a vacuum conduit to a pressure conduit. In the context of the high rotational speed of transfer disc 46, this transition period permits a steady, gradual reduction in the degree of vacuum throughout the conduit, and permits a more positive, rapid burst of pressurized air outward through the conduit upon its arrival to pressure groove 86.

To overcome any tendency in tray 24 to be kicked back immediately after its discharge, pressure groove 86 is formed with an arcuate length of approximately 65°, although for simple ejection the required length is much less. Another advantage of the extended length pressure groove is greater flexibility, in that by interchanging air pressure and vacuum connections, the pressure groove in effect can be used as a vacuum groove, and vice versa. Consequently the same transfer disc and valve plate may be used to transfer items in either the clockwise or counterclockwise direction, depending upon how the vacuum and pressure lines are connected to the valve plate.

While the above-described angular adjustment for valve plate 50 is a preferred setting, a significant feature of the present invention resides in the fact that the valve plate angular position can be adjusted in order to optimize pick-up and discharge of various workpieces. The adjustment is readily accomplished by partially withdrawing clamping screw 102, rotating the valve plate slightly in the clockwise or counterclockwise direction, then re-tightening the clamping screw. Further flexibility springs from the fact that valve plate 50 is formed of inexpensive plastic. Thus a plurality of valve plates, each with its own arrangement of vacuum and pressure groove angular positions and arcuate lengths, can be used interchangeably in connection with the same transfer disc. Flexibility is further enhanced with the ability to selectively plug some of transfer cups 48 to alter the number of operative transfer cups.

Figure 8:
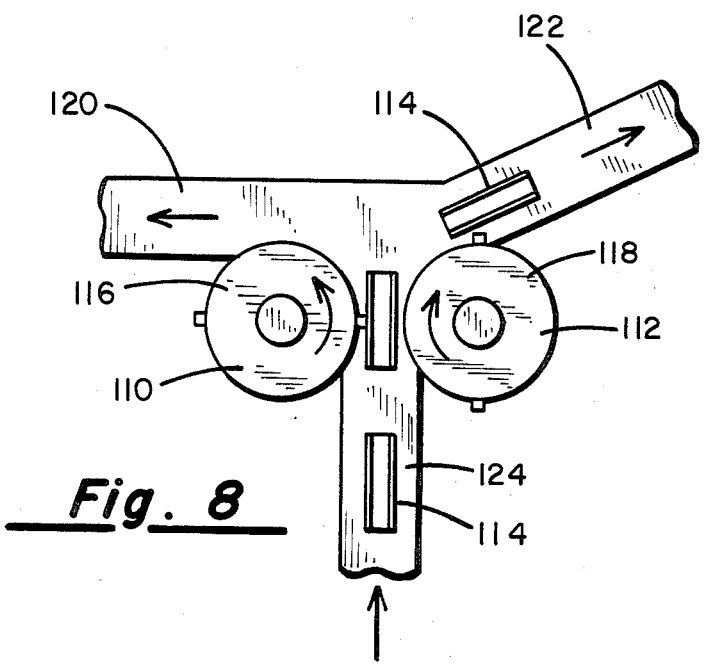
FIG. 8 is a diagrammatic top view of a card handling assembly using two rotary transfer devices in accordance with the present invention.

FIG. 8 shows a piece sorting arrangement in which left and right transfer assemblies 110 and 112, working alternately, sort a series of workpieces 114 into two separate discharge groups. Left and right transfer discs 116 and 118 of the assemblies rotate at the same speed, but are angularly offset so that successive workpieces 114 are exposed alternately to a transfer cup of disc 116, then to a transfer cup of disc 118. Pieces are thus discharged alternately to a first discharge path 120 and a second discharge path 122 offset non-orthogonally with respect to supply path 124. Release of workpieces 114 at the angle corresponding to discharge path 122 is achieved by selecting the appropriate location and arcuate length for the vacuum and pressure grooves in valve plate 124 of assembly 112. Discs 116 and 118 require only two conduits each, an arrangement that can be made by replacing transfer cups with plugs in the conduits not needed. It is readily seen that the arrangement illustrated could be used in the reverse direction, with two supply paths and one discharge path, for merging operations. Of course, the number of operating conduits could be changed in accordance with the size of the workpiece and desired transfer rate.

Figure 9:
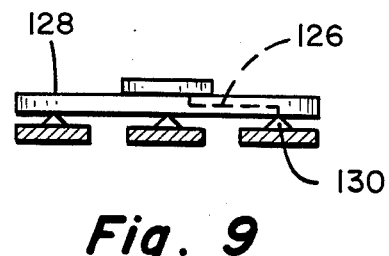
FIG. 9 is a side elevation showing an alternative rotary transfer device in accordance with the present invention.

FIG. 9 illustrates a second embodiment of the present invention, in which conduits 126 are provided with a downturned radially outward end open to the bottom surface of a transfer disc 128, rather than a radial extension to the disc perimeter. The downward openings can be provided with transfer cups 130 to provide a rotary transfer assembly particularly suited for overhead pick-up of workpieces.

Figure 10:
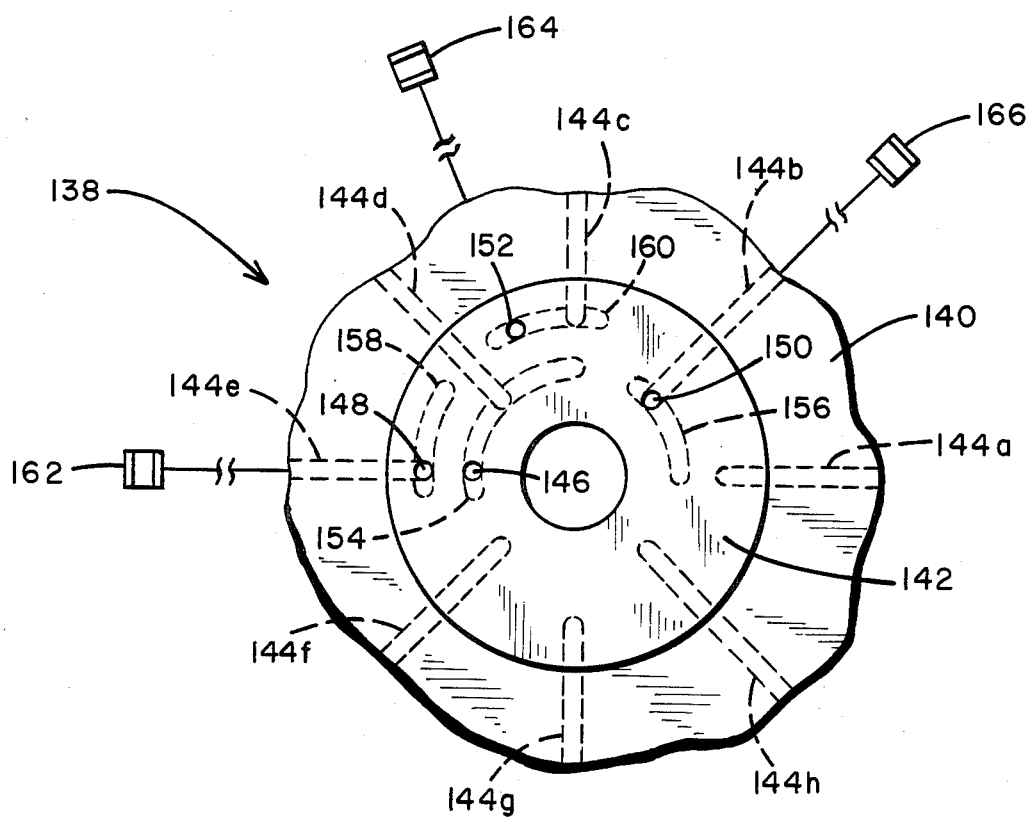
FIG. 10 is a top plan view of another alternative rotary transfer device in accordance with the present invention.

FIG. 10 shows a third embodiment of the present invention, in the form of a rotary transfer device 138 including a transfer disc 140, only part of which is shown, and a valve plate 142 in concentric, overlying relation to the disc. Eight conduits 144a-h are formed symmetrically about the transfer disc, with their inward ends located, alternately, at two different radial spacings from the disc center.

Inner and outer angularly aligned vacuum ports 146 and 148 are provided in valve plate 142, along with inner and outer pressure ports 150 and 152 which are angularly separated from each other. Formed in the bottom surface of valve plate 142, as indicated in broken lines, are an inner vacuum groove 154, an inner pressure groove 156, an outer vacuum groove 158 and an outer pressure groove 160, each in fluid communication with its respective port. Grooves 154 and 156 are aligned with the inner ends of longer conduits 144b, d, f and h, while the inner ends of the remaining conduits are aligned with grooves 158 and 160. Consequently, half of conduits 144 are selectively inwardly extended for intermittent fluid communication with the inner grooves—and half with the outer grooves.

From the positioning of the vacuum and pressure grooves, it can be appreciated that all eight conduits 144 pick up workpieces at the same pick-up location 162. However, shorter conduits a, c, e and g discharge workpieces at a first discharge location 164, and the longer conduits discharge workpieces at a second discharge location 166 downstream of discharge location 164. Consequently, transfer device 138 performs the same function as transfer assemblies 110 and 112 shown in FIG. 8.

Thus, a rotary transfer assembly constructed in accordance with the present invention affords maximum flexibility at low cost, not only due to the interchangeable mounting of different valve plates with a rotary transfer disc, but because conduits through the transfer disc can be selectably blocked, and further because the valve plate can be angularly adjusted with respect to the frame supporting the transfer disc. Moreover, using two or more transfer assemblies, or providing additional vacuum and pressure grooves in the valve plate in one assembly, permits sorting and merging operations at reduced cost and increased reliability.

What is claimed is:

1. An apparatus for transferring objects, including:
   a transfer disc and means forming a plurality of fluid conduits through said transfer disc and symmetrically arranged about said disc;
   a valve plate adjacent and coaxial with said transfer disc, and means forming in said valve plate an arcuate pressure groove in a valve surface of said valve plate facing said disc and in fluid communication with a pressurized air source, and an arcuate vacuum groove in said valve surface and in fluid communication with a vacuum source, said arcuate grooves spaced apart from each other and open to said transfer disc;
   a feed means proximate the perimeter of said disc for supplying objects to said transfer disc, and a discharge means, proximate said perimeter and angularly spaced apart from said feed means, for transporting objects away from said transfer disc;
   wherein said transfer disc is rotatable with respect to said feed means, discharge means and valve plate, to serially transfer each of said conduits to an object acquiring position in which a first and radially inward conduit end of said conduit is in fluid communication with said vacuum groove and a second, opposite end of said conduit at the perimeter of said disc is proximate said feed means, and then to an object discharge position wherein said first conduit end is in fluid communication with said pressure groove and said opposite conduit end is proximate said discharge means, said vacuum groove being in fluid communication with at least two of said conduits for at least selected time periods during rotation of said disc relative to said valve plate; and
   an adjusting means for adjustably angularly fixing said valve plate with respect to said feed means and discharge means.

2. The apparatus of claim 1 wherein:
   said adjusting means includes a fixed shaft substantially centered with respect to said valve plate a fixture, means for adjustably fastening said fixture to said shaft, and a means for fixing a radially outward end portion of said fixture to said valve plate.

3. A rotary transfer device for transferring objects from a feed station to a discharge station, including:
   a transfer disc having at least one fluid conduit having a first end at the disc perimeter and extended radially inward thereof;
   a valve plate adjacent and coaxial with said disc, and means forming a first arcuate vacuum groove in said valve plate, said groove open to said disc and in fluid communication with a first vacuum source; and
   a feed station at the disc periphery, and a discharge station at the disc periphery downstream from said feed station;
   said vacuum groove being axially aligned with a second, inward end of each conduit, whereby rotation of said disc, relative to said valve plate, feed station and discharge station, moves each of said conduits to an object acquiring position with said second end in fluid communication with said vacuum groove and said first end proximate said feed station, and then to an object discharge position wherein said second conduit end is isolated from said vacuum groove and said first conduit end is proximate said discharge station;

said valve plate being adjustably angularly, fixed with respect to said feed station and said discharge station.

4. The apparatus of claim 3 wherein:

said transfer disc has a plurality of said conduits, and said vacuum groove is in fluid communication with at least two of said conduits for at least selected time periods during rotation of said disc relative to said valve plate.

5. The apparatus of claim 4 including:

an adjusting means for adjustably angularly fixing said valve plate, including a fixture, first fastening means for adjustably fastening said fixture to a shaft at the center of said valve plate, and a second fastening means for fixing a radially outward end portion of said fixture to said valve plate.

6. The apparatus of claim 4 including:

means forming a second arcuate groove in said plate, said second groove spaced apart from said first groove, open to said disc, and in fluid communication with a first air pressure source; said conduits being in fluid communication with said pressure groove when in said object discharge position.

7. The apparatus of claim 6 wherein:

said pressure groove is in fluid communication with at least two of said conduits for at least select time periods during rotation of said disc relative to said valve plate.

8. The apparatus of claim 6 including:

means forming third and fourth arcuate grooves in said plate open to said disc, spaced apart from each other and spaced radially from said first and second grooves, and in fluid communication with said vacuum source and said air pressure source, respectively;

wherein some of said conduits are extended selectively for intermittent fluid communication with said first and second grooves, and the remainder of said conduits are extended selectively for intermittent fluid communication with said third and fourth grooves.

* * * * *